(12) United States Patent
Legare et al.

(10) Patent No.: US 11,371,436 B2
(45) Date of Patent: Jun. 28, 2022

(54) METHOD AND SYSTEM FOR REGULATING OIL FLOW TO AN ENGINE

(71) Applicant: PRATT & WHITNEY CANADA CORP., Longueuil (CA)

(72) Inventors: Pierre-Yves Legare, Chambly (CA); Eric Langevin, Lery (CA); Alain Martel, St-Paul d'Abbotsford (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 141 days.

(21) Appl. No.: 16/744,289

(22) Filed: Jan. 16, 2020

(65) Prior Publication Data
US 2021/0222621 A1 Jul. 22, 2021

(51) Int. Cl.
*F02C 7/06* (2006.01)
*F01M 1/16* (2006.01)
*F02C 9/24* (2006.01)

(52) U.S. Cl.
CPC ............... *F02C 7/06* (2013.01); *F01M 1/16* (2013.01); *F02C 9/24* (2013.01)

(58) Field of Classification Search
CPC ............... F02C 7/06; F02C 9/24; F01M 1/16
See application file for complete search history.

(56) References Cited

U.S. PATENT DOCUMENTS

| 5,339,776 | A | 8/1994 | Regueiro |
| 6,626,141 | B2 | 9/2003 | Choi |
| 6,904,879 | B2 | 6/2005 | Kato |
| 8,734,122 | B2 | 5/2014 | Murray et al. |
| 2002/0173391 | A1* | 11/2002 | Endo ................. B60L 50/16 474/18 |
| 2006/0054406 | A1* | 3/2006 | Delaloye ............. F01D 25/18 184/6.11 |
| 2015/0270748 | A1 | 9/2015 | de la Chevasnerie et al. |
| 2019/0002118 | A1* | 1/2019 | Nestico ................. B64D 29/06 |

FOREIGN PATENT DOCUMENTS

DE 102017122115 A1 * 3/2019 ............... F01M 5/00

OTHER PUBLICATIONS

Extended European Search Report, dated May 6, 2021 in counterpart EP application.

* cited by examiner

*Primary Examiner* — Jacob M Amick
*Assistant Examiner* — Charles J Brauch
(74) *Attorney, Agent, or Firm* — Norton Rose Fulbright Canada LLP

(57) ABSTRACT

Systems and methods for regulating oil flow to an engine are described herein. An oil pressure target for the engine is determined based on one or more engine operating parameters. Oil flow to the engine is controlled based on the oil pressure target. Closed-loop feedback of oil pressure of the engine is obtained from at least one sensor during the controlling of the oil flow to the engine. A pressure difference between the oil pressure target and the closed-loop feedback of the oil pressure of the engine is determined. The oil flow to the engine is adjusted based on the pressure difference.

20 Claims, 4 Drawing Sheets

METHOD AND SYSTEM FOR REGULATING OIL FLOW TO AN ENGINE

TECHNICAL FIELD

The present disclosure relates generally to engines, and, more particularly, to methods and systems for regulating oil flow to an engine.

BACKGROUND OF THE ART

When an engine is operated, an oil pump may be used to provide oil to various parts of the engine. The oil pressure of the engine may be set at a predetermined value and when the oil pressure falls below the predetermined value, an indicator may display a warning in a cockpit of an aircraft. There is room for improvement.

SUMMARY

In one aspect, there is provided a method for regulating oil flow to an engine. The method comprises determining an oil pressure target for the engine based on one or more engine operating parameters, controlling oil flow to the engine based on the oil pressure target, obtaining closed-loop feedback of oil pressure of the engine from at least one sensor during the controlling of the oil flow to the engine, determining a pressure difference between the oil pressure target and the closed-loop feedback of the oil pressure of the engine, and adjusting the oil flow to the engine based on the pressure difference.

In one aspect, there is provided an engine controller for regulating oil pressure to an engine. The engine controller comprises at least one processing unit and at least one non-transitory computer-readable memory having stored thereon program instructions. The program instructions are executable by the at least one processing unit for determining an oil pressure target for the engine based on one or more engine operating parameters, controlling oil flow to the engine based on the oil pressure target, obtaining closed-loop feedback of oil pressure of the engine from at least one sensor during the controlling of the oil flow to the engine, determining a pressure difference between the oil pressure target and the closed-loop feedback of the oil pressure of the engine, and adjusting the oil flow to the engine based on the pressure difference.

In one aspect, there is provided a system for regulating oil pressure to an engine. The system comprises a pressure valve adapted for controlling oil flow in a fluid circuit of the engine, a torque motor coupled to the pressure valve for controlling the pressure valve, at least one sensor configured for measuring oil pressure in the fluid circuit, and an engine controller connected to the torque motor and to the at least one sensor. The engine controller is configured for determining an oil pressure target for the engine based on one or more engine operating parameters, commanding the torque motor to control oil flow to the engine based on the oil pressure target, obtaining closed-loop feedback of oil pressure of the engine from the at least one sensor during the control of the oil flow to the engine, determining a pressure difference between the oil pressure target and the closed-loop feedback of the oil pressure of the engine, and commanding the torque motor to adjust the oil flow to the engine based on the pressure difference.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
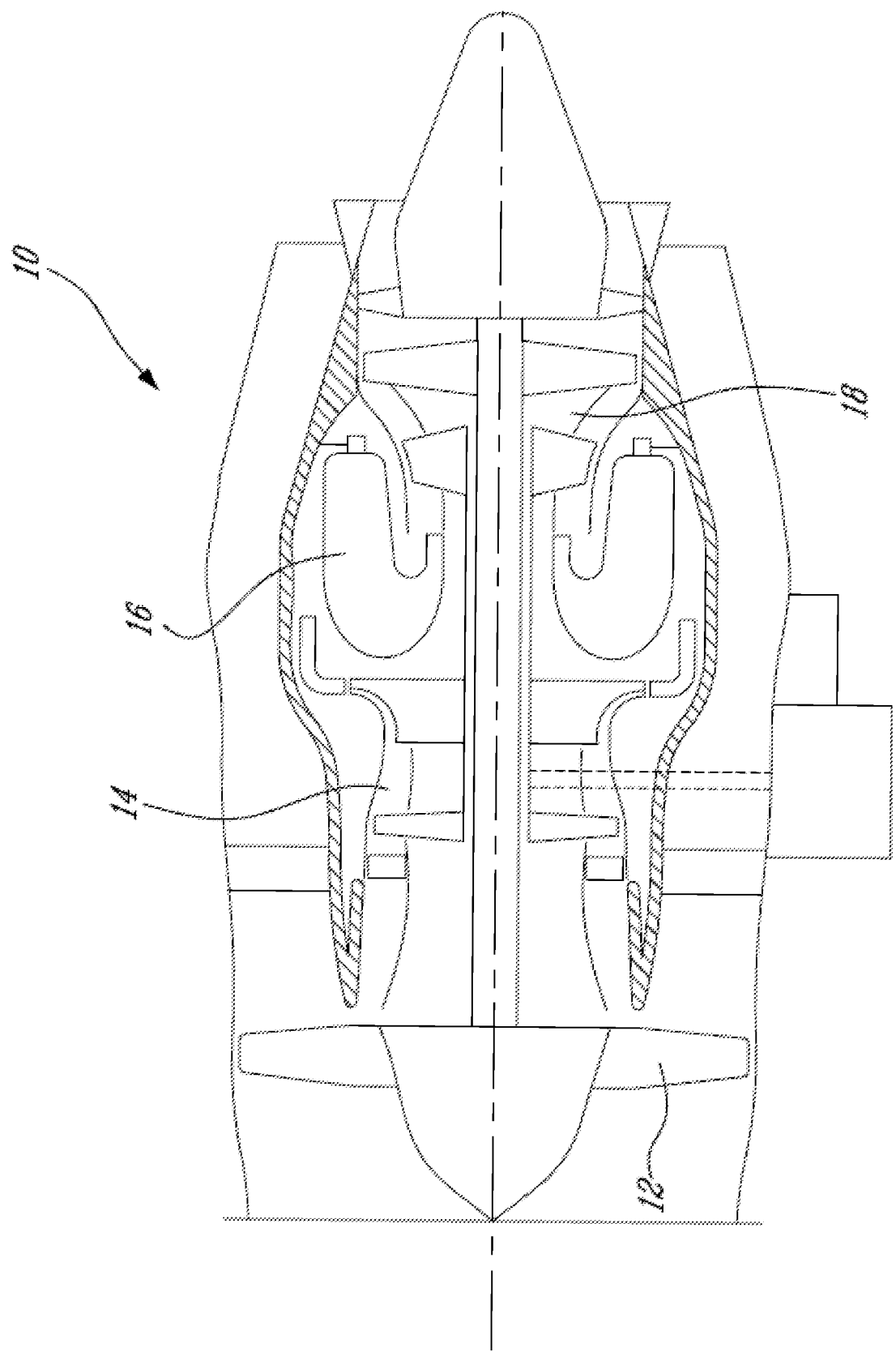
FIG. 1 is a schematic cross-sectional view of an example gas turbine engine, in accordance with one or more embodiments.

FIG. 1 illustrates a gas turbine engine 10, which an oil flow thereof may be regulated with the systems and methods described herein. The engine 10 generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Note that while engine 10 is a turbofan engine, the systems and methods for regulating oil flow to an engine may be applicable to turboprop engines, turboshaft engines, or other suitable types of engines (e.g., aircraft engines, automotive engines, industrial engines, etc.).

Figure 2:
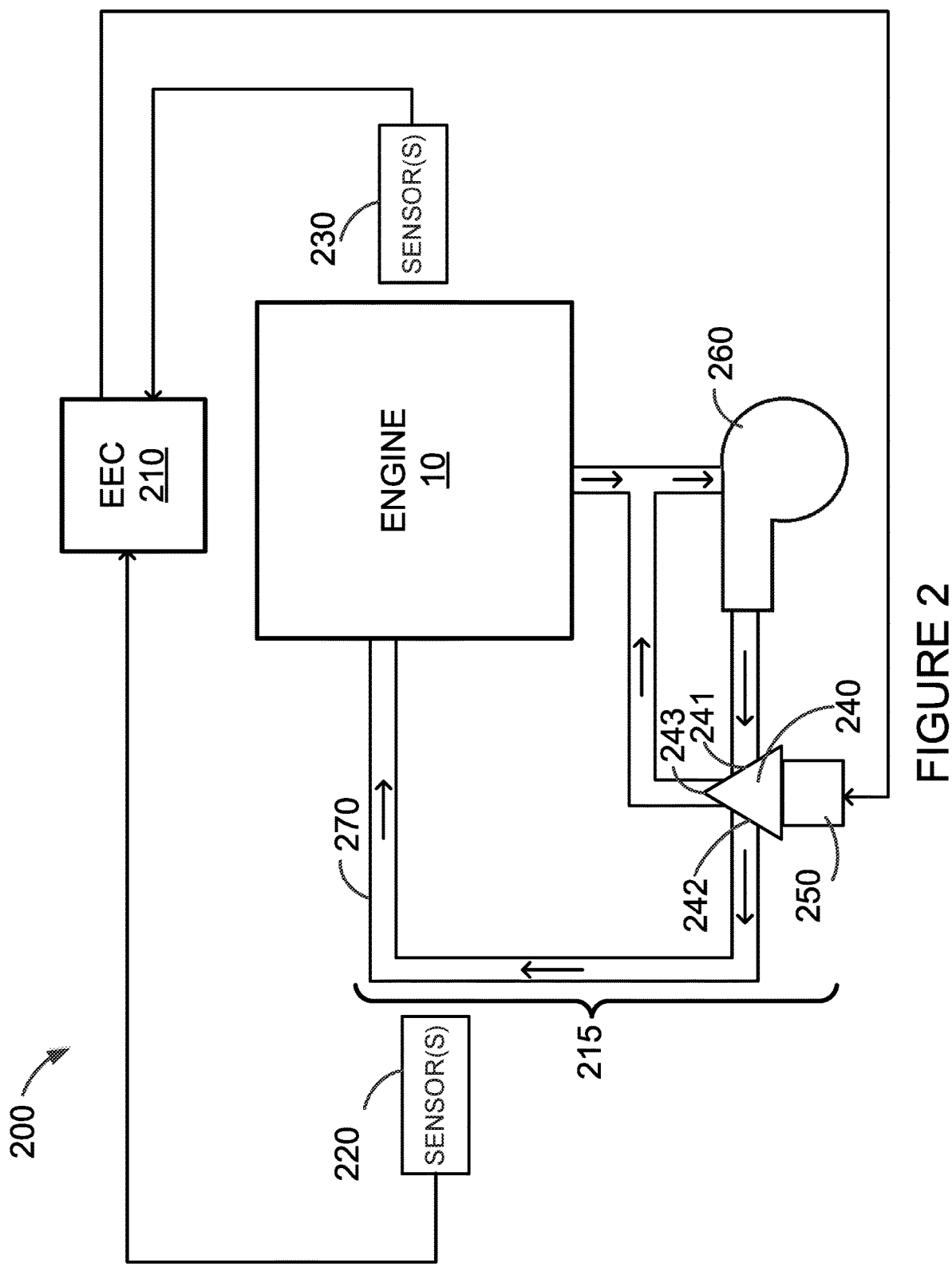
FIG. 2 is a schematic of an example system for regulation oil flow to an engine, in accordance with one or more embodiments.

With reference to FIG. 2, a system 200 for regulating oil flow to an engine, such as the engine 10, is illustrated. The system 200 comprises an electronic engine controller (EEC) 210. The EEC 210 is configured to determine an oil pressure target for the engine 10 based on one or more engine operating parameters. The EEC 210 is configured to control oil flow to the engine 10 based on the oil pressure target. The EEC 210 is configured to obtain closed-loop feedback of the oil pressure of the engine 10 from at least one sensor 220 during the control of the oil flow to the engine 10. The EEC 210 is configured to determine a pressure difference between the oil pressure target and the closed-loop feedback of the oil pressure of the engine 10. The EEC 210 is configured to adjust the oil flow to the engine 10 based on the pressure difference.

The sensor(s) 220 may be any suitable sensor(s) for measuring oil pressure. While the sensor(s) 220 are shown separate from a lubrication system 215 of the engine 10, this is for example purposes only. The sensor(s) 220 may be integrated into the lubrication system 215 at any suitable position of the lubrication system 215. The sensor(s) 220 may be part of the system 200 or may be separate from the system 200. The closed-loop feedback of the oil pressure of the engine 10 may be continuously received (e.g., in real time) and/or may be received in accordance with any suitable time interval or irregularly. The sensor(s) 220 may be connected to the EEC 210 to provide the closed-loop feedback of the oil pressure of the engine 10 to the EEC 210. Alternatively, the closed-loop feedback of the oil pressure of the engine 10 may be provided by one or more aircraft or/and engine computers and/or by any other suitable intermediary device(s). The aircraft and/or engine computer(s) and/or intermediary device(s) may be configured for obtaining the closed-loop feedback of the oil pressure of the engine 10 from the sensor(s) 220. The closed-loop feedback of the oil pressure of the engine 10 corresponds to the actual oil pressure of the engine 10. The closed-loop feedback of the oil pressure may vary from the oil pressure target.

The engine operating parameters may be obtained in any suitable manner. The engine operating parameters may be obtained from one or more sensors 230 connected to the EEC 210. While the sensor(s) 230 are shown separate from the engine 10 this is for example purposes only. The sensor(s) 230 may be any suitable sensors for measuring one or more engine operating parameters. One or more of the sensors 230 may be engine sensors coupled to the engine 10. One or more of the sensors 230 may be aircraft sensors coupled to the aircraft. The sensor(s) 230 may be part of the system 200 or may be separate from the system 200. The engine operating parameters may be continuously received (e.g., in real time) and/or may be received in accordance with any suitable time interval or irregularly. Additionally or alternatively, one or more of the engine operating parameters may be provided by one or more aircraft or/and engine computers and/or by any other suitable intermediary device(s). The aircraft and/or engine computer(s) and/or intermediary device(s) may be configured for obtaining the engine operating parameters from the sensor(s) 230. In some embodiments, one or more of the engine operating parameters may be generated by the EEC 210 based on measured operating engine parameter(s). The engine operating parameter(s) may comprise any one or more of: atmospheric pressure, atmospheric temperature, oil temperature, engine rotational speed, engine filter conditions and any other suitable engine operating parameters. While the EEC 210 is illustrated as separate from the engine 10, in some embodiments, the EEC 210 may be provided as part of the engine 10 and/or coupled to the engine 10.

The oil pressure target may be determined in any suitable manner from the engine operating parameter(s). One or more functions, equations, maps, look-up tables, algorithms and/or the like may be used to determine the oil pressure target. The oil pressure target corresponds to the desired oil pressure for the engine 10. In some embodiments, the oil pressure target may vary depending on a mode of operation of the engine 10 and/or on a mode of operation of an aircraft that is operating with the engine 10. Accordingly, the oil pressure target may be determined from the engine operating parameter(s) and the mode of operation. The mode of operation may correspond to an operating mode set by a power lever of an aircraft. The mode of operation may correspond to any one of: flight idle, ground idle, forward thrust, maximum forward thrust, reverse thrust, maximum reverse thrust, and any other suitable mode of operation. The mode of operation may correspond to a flight condition of an aircraft. The flight condition may correspond to any one of: take-off, climb, go-around, cruise, descent, landing or any other suitable flight condition of the aircraft.

In some embodiments, the oil pressure target is determined by obtaining the oil pressure target from an oil pressure map indicating oil pressure as a function of at least one engine operating parameter. For example, the EEC 210 may have stored therein a plurality of oil pressure maps. One of the oil pressure maps may be selected based on one or more of the engine operating parameters and/or based on the mode of operation. By way of a specific and non-limiting example, each one of a plurality of oil pressure maps may correspond to a different oil temperature (or a different range of oil temperatures) and one of the oil pressure maps may be selected based on the oil temperature. By way of another specific and non-limiting example, each one of a plurality of oil pressure maps may correspond to a different mode of operation and one of the oil pressure maps may be selected based on the current mode of operation. The selected oil pressure map may vary as a function of engine rotational speed and the oil pressure target may be determined from the selected oil pressure map based on the rotational speed of the engine 10. Any suitable oil pressure map may be used which receives one or more of the engine operating parameter(s) as input parameters to the map and is used to obtain the oil pressure target therefrom.

In the illustrated example, the lubrication system 215 comprises a pressure adjustable valve 240 adapted to control the oil flow to the engine 10 and a torque motor 250 coupled to the valve 240 for controlling the valve 240. Any suitable control mechanism may be controlled by the EEC 210 for regulating oil flow to the engine 10, and the valve 240 and the torque motor 250 combination is one possible implementation. An oil pump 260 circulates oil to the engine 10 via a fluid circuit 270. The fluid circuit 270 may comprise any suitable oil lines, passageways and/or the like for providing the oil to the engine 10. The oil pump 260 is configured to obtain oil from an oil reservoir configured for holding the oil. The oil pump 260 is configured to provide the oil to the valve 240. The valve 240 may be controlled in order to adjust the oil pressure and the quantity of oil provided to the engine 10. The EEC 210 may command the torque motor 250 based on the oil pressure target for adjusting the valve 240 to regulate the oil flow. The valve 240 is controlled in order to adjust the oil pressure towards the oil pressure target. However, the actual oil pressure after the valve 240 is adjusted may be different from the oil pressure target. Accordingly, the EEC 210 may command the torque motor 250 based on the pressure difference for adjusting the valve 240 to regulate the oil flow. The adjusting of the valve 240 based on the pressure difference may be continuously performed (e.g., in real time) and/or may be performed in accordance with any suitable time interval or irregularly in order to minimize the difference between the oil pressure target and the actual oil pressure. In the illustrated embodiment, the valve 240 is a three-way valve. The pump 260 may provide oil to a first port 241 of the three-way valve 240 at a given pressure and the three-way valve 240 may be controlled to reduce the pressure of the oil provided by a second port 242 of the valve 240 that provides the oil to the engine 10. Oil may be returned from a third port 243 of the three-way valve 240 to the pump 260 and/or the oil reservoir. In other words, when the three-way valve 240 is fully open, the oil received at the first port 241 is outputted by the second port 242 without any oil being provided by the third port 243; and when the three-way valve 240 is fully closed, the oil received at the first port 241 is outputted by the third port 243 without any oil being provided via the second port 242. The configuration of the valve 240 may vary depending on practical implementations. The oil may be returned from the engine 10 via the fluid circuit 270 to the pump 260 and/or the oil reservoir. The lubrication system 215 and/or one or more aspects of the lubrication system 215 may be provided as part of the system 200. The sensor(s) 220 may be configured for measuring oil pressure in the fluid circuit 270. The sensor(s) 220 may be integrated into the fluid circuit 270 at any suitable position. The lubrication system 215 may vary depending on practical implementations. The lubrication system 215 may be implemented with any suitable oil pressure supply and oil scavenge system.

In some embodiments, the EEC 210 may control shutoff of the oil to the engine 10 by commanding the torque motor 250 to close the valve 240 during certain modes of operation of the engine and/or aircraft. For example, the valve 240 may be closed to prevent cabin air contamination.

Figure 3:
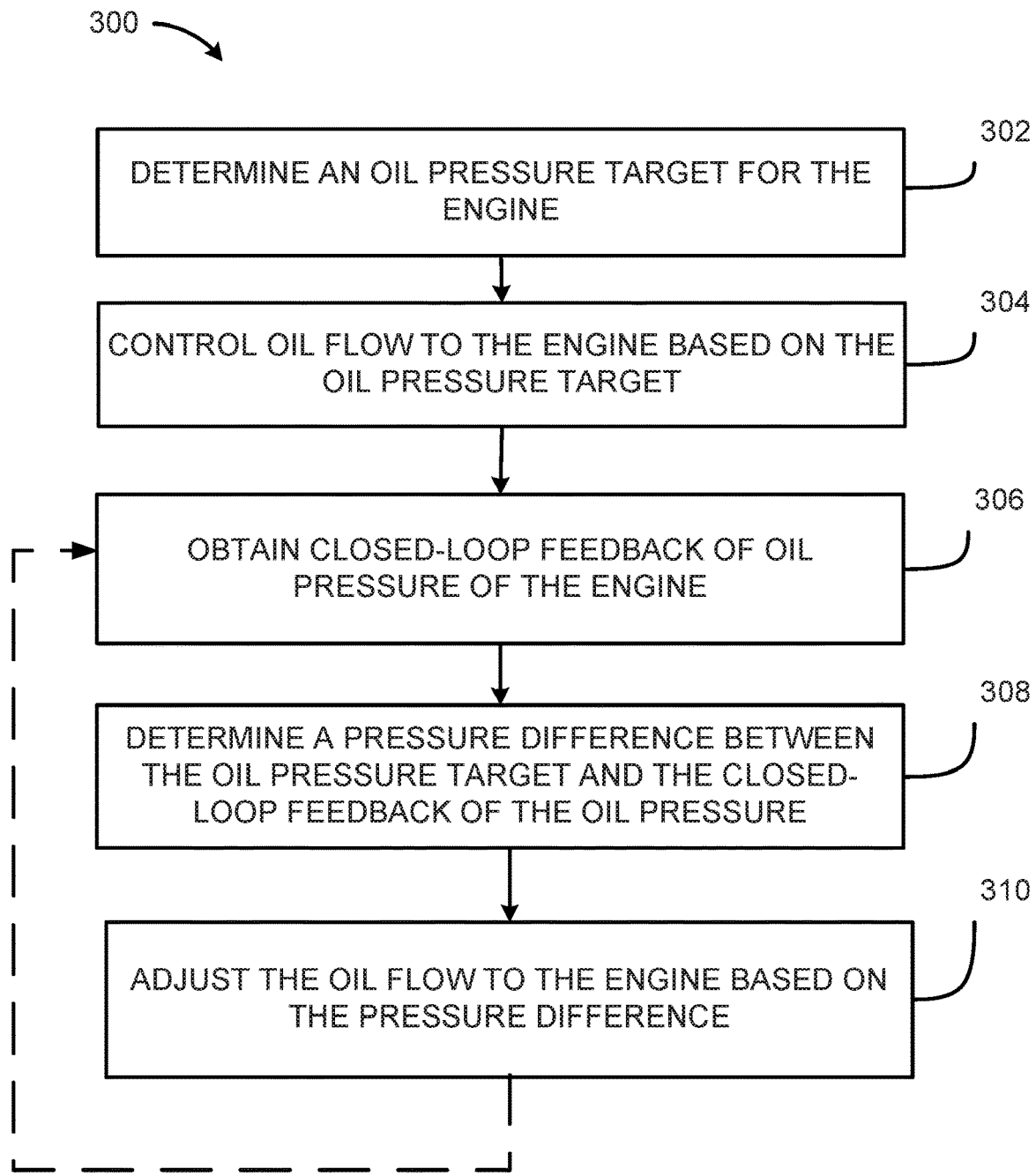
FIG. 3 is a flowchart illustrating an example method for regulation oil flow to an engine, in accordance with one or more embodiments.

With reference to FIG. 3, there is shown a flowchart illustrating an example method 300 for regulating oil flow to an engine. The method 300 may be implemented by any suitable engine controller, such as the EEC 210, or may be implemented by any other suitable engine and/or aircraft computer. While the method 300 is described herein with reference to the engine 10 of FIG. 1 and aspects of FIG. 2 this is for example purposes only.

At step 302, an oil pressure target for the engine 10 is determined based on one or more engine operating parameters. The engine operating parameter(s) may be obtained in any suitable manner. The engine operating parameter(s) may comprise any one or more of: atmospheric pressure, atmospheric temperature, oil temperature, engine rotational speed and engine filter conditions. The oil pressure target may be determined in any suitable manner. In some embodiments, determining the oil pressure target comprises determining the oil pressure target based on the engine operating parameter(s) and a mode of operation of the engine 10. The mode of operation may correspond to any one of: flight idle, ground idle, forward thrust and reverse thrust. In some embodiments, determining the oil pressure target comprises determining the oil pressure target based on the engine operating parameter(s) and a flight condition. The flight condition may correspond to any one of: take-off, climb, go-around, cruise, descent, landing or any other suitable flight condition of the aircraft. In some embodiments, determining the oil pressure target comprises obtaining the oil pressure target from an oil pressure map indicating oil pressure as a function of one or more engine operating parameters (e.g., engine rotational speed and/or oil temperature).

At step 304, oil flow to the engine 10 is controlled based on the oil pressure target. The oil flow to the engine 10 may be controlled in any suitable manner. In some embodiments, controlling oil flow to the engine based on the oil pressure target comprises adjusting a controllable valve based on the oil pressure target. In some embodiments, controlling oil flow to the engine 10 based on the oil pressure target comprises commanding a torque motor 250 based on the oil pressure target to adjust a pressure valve 240 adapted to control the oil flow to the engine 10.

At step 306, closed-loop feedback of oil pressure of the engine 10 is obtained from at least one sensor 220 during the controlling of the oil flow to the engine 10. The closed-loop feedback of oil pressure of the engine 10 may be obtain in any suitable manner.

At step 308, a pressure difference between the oil pressure target and the closed-loop feedback of the oil pressure of the engine 10 is determined. The pressure difference is indicative of an error between the desired oil pressure of the engine 10 and the actual oil pressure of the engine 10.

At step 310, the oil flow to the engine 10 is adjusted based on the pressure difference. The oil flow to the engine 10 may be adjusted in any suitable manner. In some embodiments, adjusting the oil flow based on the pressure difference comprises adjusting a controllable valve based on the pressure difference. In some embodiments, adjusting the oil flow to the engine 10 comprises commanding the torque motor 250 based on the pressure difference to adjust the pressure valve 240.

In some embodiments, after step 310, the method 300 may proceed to step 306 and the method 300 may be repeated during operation of the engine 10. Alternatively, each of steps 306, 308, 310 may be continuously performed (e.g., in real time) and/or may be performed in accordance with any suitable time interval or irregularly. The method 300 may be repeated any suitable number of times during operation of the engine 10. For example, step 302 may be performed at any suitable time interval or irregularly, and the proceeding steps of the method 300 may then be performed. Step 302 may be performed in response to detecting a change in one or more of the engine operating parameters, which may indicative that the oil pressure target should be re-determined and consequently the control of the oil flow may also need to be modified, Step 302 may be performed in response to detecting a change in the mode of operation, which may indicative that the oil pressure target should be re-determined and consequently the control of the oil flow may also need to be modified. The order of the steps of the method 300 may vary depending on practical implementations and/or some of the steps may be performed at the same time.

It should be appreciated that the system 200 and/or the method 300 may allow for improved oil flows in different phases of flight, which may result in lower maintenance and/or reduced oil consumption. Oil regulation and cold start valves may be combined, which may provide improved flexibility and/or result in less parts to maintain. The term "oil pressure" may be used herein to refer to "main oil pressure". The term "oil temperature" may be used herein to refer to "main oil temperature".

Figure 4:
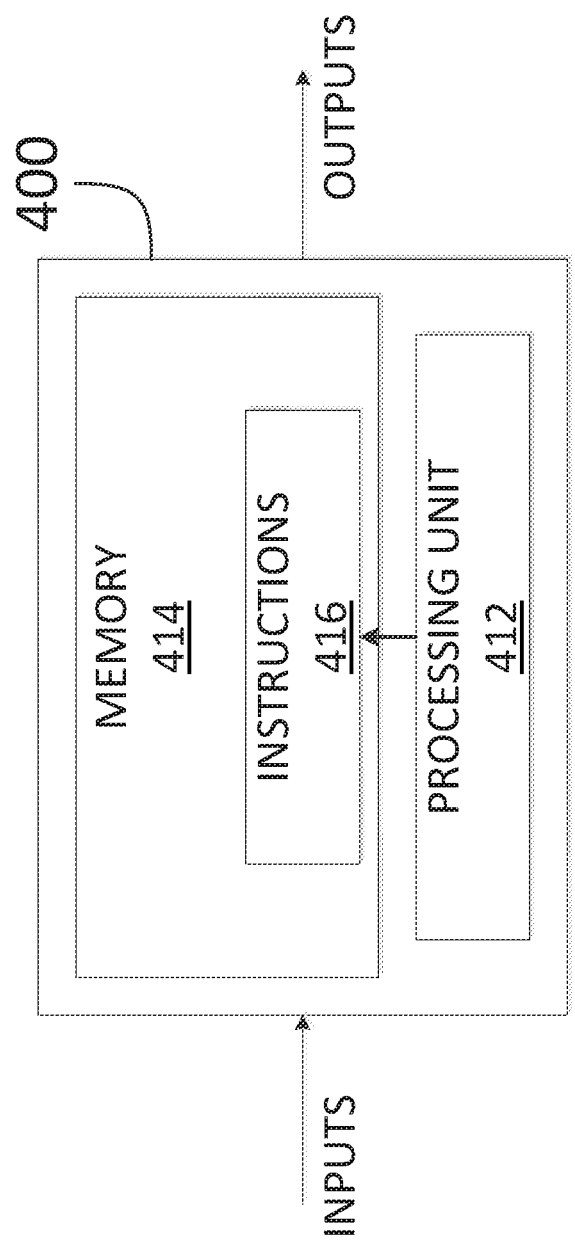
FIG. 4 is an example computing device, in accordance with one or more embodiments.

With reference to FIG. 4, the system 200 and/or the method 300 may be implemented using at least one computing device 400. For example, the EEC 210, may be implemented by at least one computing device 400. The computing device 400 comprises a processing unit 412 and a memory 414 which has stored therein computer-executable instructions 416. The processing unit 412 may comprise any suitable devices such that instructions 416, when executed by the computing device 400 or other programmable apparatus, may cause at least in part the functions/acts/steps of the method 300 as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412. In some embodiments, the computing device 400 can be implemented as part of a full-authority digital engine controls (FADEC) or other similar device, including an EEC, an engine control unit (ECU), and the like. In some embodiments, the EEC 210 is implemented by a FADEC.

The methods and systems for regulating oil flow to an engine described herein may be implemented in a high level procedural or object oriented programming or scripting language, or a combination thereof, to communicate with or assist in the operation of a computer system, for example the computing device 400. Alternatively, the methods and systems for regulating oil flow to an engine may be implemented in assembly or machine language. The language may be a compiled or interpreted language. Program code for implementing the methods and systems for regulating oil flow to an engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for regulating oil flow to an engine may also be considered to be implemented by way of a non-transitory computer-readable storage medium having a computer program stored thereon. The computer program may comprise computer-readable instructions which cause a computer, or in some embodiments the processing unit 412 of the computing device 400, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the EEC 210 may be interchanged with any suitable engine controller or any suitable computer (e.g., an engine and/or aircraft computer). By way of another example, the combination of the valve 240 and the torque motor 250 may be replaced with any suitable controllable valve. Yet further modifications could be implemented by a person of ordinary skill in the art in view of the present disclosure, which modifications would be within the scope of the present technology.

The invention claimed is:

1. A method for regulating oil flow to an engine provided on an aircraft, the method comprising:
   determining an oil pressure target for the engine based on one or more engine operating parameters and on a mode of operation set by a power lever of the aircraft, the mode of operation depending on a flight condition of the aircraft, the oil pressure target updated in real-time in response to detecting a change in at least one of the one or more engine operating parameters and the mode of operation;
   controlling oil flow to the engine based on the oil pressure target;
   obtaining closed-loop feedback of oil pressure of the engine from at least one sensor during the controlling of oil flow to the engine based on the oil pressure target;
   determining a pressure difference between the oil pressure target and the closed-loop feedback of the oil pressure of the engine; and
   adjusting oil flow to the engine based on the pressure difference.

2. The method of claim 1, wherein the mode of operation corresponds to any one of:
   flight idle, ground idle, forward thrust and reverse thrust.

3. The method of claim 1, wherein determining the oil pressure target comprises obtaining the oil pressure target from an oil pressure map indicating oil pressure as a function of engine rotational speed.

4. The method of claim 1, wherein the one or more engine operating parameters comprise any one or more of: atmospheric pressure, atmospheric temperature, oil temperature, engine rotational speed and engine filter conditions.

5. The method of claim 1, wherein controlling oil flow to the engine based on the oil pressure target comprises commanding a torque motor based on the oil pressure target to adjust a pressure valve adapted to control oil flow to the engine.

6. The method of claim 5, wherein adjusting oil flow to the engine based on the pressure difference comprises commanding the torque motor based on the pressure difference to adjust the pressure valve.

7. An engine controller for regulating oil pressure to an engine provided on an aircraft, the engine controller comprising:
   at least one processing unit; and
   at least one non-transitory computer-readable memory having stored thereon program instructions executable by the at least one processing unit for:
   determining an oil pressure target for the engine based on one or more engine operating parameters and on a mode of operation set by a power lever of the aircraft, the mode of operation depending on a flight condition of the aircraft, the oil pressure target updated in real-time in response to detecting a change in at least one of the one or more engine operating parameters and the mode of operation;
   controlling oil flow to the engine based on the oil pressure target;
   obtaining closed-loop feedback of oil pressure of the engine from at least one sensor during the controlling of oil flow to the engine based on the oil target;
   determining a pressure difference between the oil pressure target and the closed-loop feedback of the oil pressure of the engine; and
   adjusting oil flow to the engine based on the pressure difference.

8. The engine controller of claim 7, wherein the mode of operation corresponds to any one of: flight idle, ground idle, forward thrust and reverse thrust.

9. The engine controller of claim 7, wherein determining the oil pressure target comprises obtaining the oil pressure target from an oil pressure map indicating oil pressure as a function of engine rotational speed.

10. The engine controller of claim 7, wherein the one or more engine operating parameters comprise any one or more of: atmospheric pressure, atmospheric temperature, oil temperature, engine rotational speed and engine filter conditions.

11. The engine controller of claim 7, wherein controlling oil flow to the engine based on the oil pressure target comprises commanding a torque motor based on the oil pressure target to adjust a pressure valve adapted to control oil flow to the engine.

12. The engine controller of claim 11, wherein adjusting oil flow to the engine based on the pressure difference comprises commanding the torque motor based on the pressure difference to adjust the pressure valve.

13. A system for regulating oil pressure to an engine provided on an aircraft, the system comprising:
- a pressure valve adapted for controlling oil flow in a fluid circuit of the engine;
- a torque motor coupled to the pressure valve for controlling the pressure valve;
- at least one sensor configured for measuring oil pressure in the fluid circuit; and
- an engine controller connected to the torque motor and to the at least one sensor, the engine controller configured for:
  - determining an oil pressure target for the engine based on one or more engine operating parameters and on a mode of operation set by a power lever of the aircraft, the mode of operation depending on a flight condition of the aircraft, the oil pressure target updated in real-time in response to detecting a change in at least one of the one or more engine operating parameters and the mode of operation;
  - commanding the torque motor to control oil flow to the engine based on the oil pressure target;
  - obtaining closed-loop feedback of oil pressure of the engine from the at least one sensor during the control of oil flow to the engine based on the oil pressure target;
  - determining a pressure difference between the oil pressure target and the closed-loop feedback of the oil pressure of the engine; and
  - commanding the torque motor to adjust oil flow to the engine based on the pressure difference.

14. The system of claim 13, wherein the mode of operation corresponds to any one of: flight idle, ground idle, forward thrust and reverse thrust.

15. The system of claim 13, wherein determining the oil pressure target comprises obtaining the oil pressure target from an oil pressure map indicating oil pressure as a function of engine rotational speed.

16. The system of claim 13, wherein the one or more engine operating parameters comprise any one or more of: atmospheric pressure, atmospheric temperature, oil temperature, engine rotational speed and engine filter conditions.

17. The system of claim 13, wherein the pressure valve is a three-way valve.

18. The method of claim 1, wherein the flight condition corresponds to any one of: take-off, climb, go-around, cruise, descent, and landing.

19. The engine controller of claim 7, wherein the flight condition corresponds to any one of: take-off, climb, go-around, cruise, descent, and landing.

20. The system of claim 13, wherein the flight condition corresponds to any one of: take-off, climb, go-around, cruise, descent, and landing.

* * * * *